(12) United States Patent
Kamimaeda et al.

(10) Patent No.: US 9,179,186 B2
(45) Date of Patent: *Nov. 3, 2015

(54) METHOD AND APPARATUS FOR IMAGE PROCESSING, PROGRAM, AND RECORDING MEDIUM

(71) Applicant: Sony Corporation, Tokyo (JP)

(72) Inventors: Naoki Kamimaeda, Kanagawa (JP); Hiroyuki Masuda, Tokyo (JP); Tomohiro Tsunoda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 271 days.

This patent is subject to a terminal disclaimer.

(21) Appl. No.: 13/853,272

(22) Filed: Mar. 29, 2013

(65) Prior Publication Data

US 2013/0227600 A1 Aug. 29, 2013

Related U.S. Application Data

(63) Continuation of application No. 12/553,205, filed on Sep. 3, 2009, now Pat. No. 8,434,109.

(30) Foreign Application Priority Data

Sep. 8, 2008 (JP) ................................. 2008-230321

(51) Int. Cl.
*H04N 21/442* (2011.01)
*H04N 21/258* (2011.01)
*H04N 21/45* (2011.01)
*H04N 21/466* (2011.01)

(52) U.S. Cl.
CPC ... *H04N 21/44222* (2013.01); *H04N 21/25891* (2013.01); *H04N 21/4532* (2013.01); *H04N 21/4668* (2013.01)

(58) Field of Classification Search
CPC .............. H04N 2005/44556; H04N 21/254; H04N 21/25891; H04N 21/431; H04N 21/4334; H04N 21/44218; H04N 21/4532; H04N 21/458; H04N 21/4583; H04N 21/472; H04N 21/47202; H04N 21/47214; H04N 21/4821

See application file for complete search history.

(56) References Cited

U.S. PATENT DOCUMENTS 7,716,704 B2 * 5/2010 Wang et al. ..................... 725/46
7,772,479 B2   8/2010 Kobayashi (Continued)

FOREIGN PATENT DOCUMENTS

JP    2001-186453    7/2001
JP    2004-192460    7/2004

(Continued)

*Primary Examiner* — Ngoc Vu
(74) *Attorney, Agent, or Firm* — Hazuki International, LLC

(57) ABSTRACT

An information processing apparatus includes a managing unit that manages a scale calculated based on descriptions of an operation performed on a predetermined item and a series to which the item belongs in association with each other, a first extracting unit that extracts items belonging to the same series as top N series, obtained by sorting the scales, from among a plurality of items, a taste managing unit that manages taste of a user, a second extracting unit that calculates the degree of similarity between the taste managed by the taste managing unit and each item to extract items with higher degrees of similarity, and a recommending unit that recommends a predetermined number of items among the items extracted by the first extracting unit and the items extracted by the second extracting unit to the user.

9 Claims, 9 Drawing Sheets

(56) References Cited

U.S. PATENT DOCUMENTS

| | | | |
|---|---|---|---|
| 8,434,109 B2 * | 4/2013 | Kamimaeda et al. | 725/46 |
| 2007/0288965 A1 | 12/2007 | Murakami et al. | |
| 2008/0120650 A1 * | 5/2008 | Orihara et al. | 725/45 |
| 2009/0234876 A1 | 9/2009 | Schigel et al. | |

FOREIGN PATENT DOCUMENTS

| | | |
|---|---|---|
| JP | 2007-43471 | 2/2007 |
| JP | 2007-323398 | 12/2007 |
| JP | 2008-10951 | 1/2008 |

* cited by examiner

FIG. 2

OPERATION LOG DATABASE (31)

| ITEM ID | USER ID | LOG TYPE | LOG RECORDING DATE AND TIME |
|---|---|---|---|
| 1001 | 1 | Recording | 12-05-2007 08:39:44 |
| 1003 | 3 | Retrieval | 12-05-2007 08:39:51 |
| 1009 | 1 | Good | 12-05-2007 08:39:52 |
| 1003 | 1 | Transfer | 12-06-2007 08:39:46 |
| 1001 | 3 | Poor | 12-08-2007 08:39:49 |

FIG. 3

USER TASTE DATABASE (32)

| USER ID | ATTRIBUTE ID | ATTRIBUTE VALUE | IMPORTANCE LEVEL |
|---|---|---|---|
| 1 | 1 | 30 | 0.5 |
| 1 | 2 | 2 | 0.3 |
| 1 | 2 | 4 | 1.3 |
| 1 | 2 | 52 | 4.4 |
| 2 | 1 | 63 | 1.2 |
| 2 | 2 | 4 | 0.3 |
| 2 | 2 | 45 | 0.6 |

FIG. 4

ITEM META DATABASE (33)

| ITEM ID | ATTRIBUTE ID | ATTRIBUTE VALUE | NUMBER OF UPDATING TIMES | IMPORTANCE LEVEL |
|---|---|---|---|---|
| 1001 | 1 | 153144 | 1 | 1.5845 |
| 1002 | 1 | 153144 | 1 | 1.5845 |
| 1003 | 1 | 153144 | 1 | 1.5845 |
| 1004 | 1 | 153144 | 1 | 1.5845 |
| 1005 | 1 | 153144 | 1 | 1.5845 |

FIG. 5

ITEM STATE MANAGEMENT DATABASE 34

| USER ID | SERIES ID | VIEWED DATE | VIEWED BROADCASTED DATE | PROGRAMMED DATE | RECORDED DATE | BROADCASTED DATE | NUMBER OF RECORDING TIMES | NUMBER OF BROADCASTING TIMES | ACCUMULATED VALUE | USER UPDATE DATE | RECORD UPDATE DATE |
|---|---|---|---|---|---|---|---|---|---|---|---|
| 1 | 2 | 08-11-2008 10:41:16 | 01-01-0001 00:00:00 | 08-12-2008 03:00:00 | 08-11-2008 03:10:00 | 08-16-2008 02:55:00 | 4 | 36 | 80229 | 08-11-2008 11:50:13 | 08-09-2008 06:17:21 |
| 1 | 187 | 01-01-0001 00:00:00 | 01-01-0001 00:00:00 | 08-09-2008 01:50:00 | 01-01-0001 00:00:00 | 08-16-2008 01:50:00 | 0 | 2 | 629233 | 08-08-2008 21:41:59 | 08-09-2008 23:27:12 |
| 1 | 1 | 01-01-0001 00:00:00 | 01-01-0001 00:00:00 | 01-01-0001 00:00:00 | 01-01-0001 00:00:00 | 08-16-2008 20:00:00 | 0 | 26 | 148021 | 08-08-2008 23:15:33 | 08-09-2008 23:25:40 |
| 1 | 3 | 01-01-0001 00:00:00 | 01-01-0001 00:00:00 | 01-01-0001 00:00:00 | 01-01-0001 00:00:00 | 08-16-2008 10:05:00 | 0 | 34 | 95572 | 08-08-2008 23:15:33 | 08-09-2008 23:25:40 |
| 1 | 4 | 01-01-0001 00:00:00 | 01-01-0001 00:00:00 | 01-01-0001 00:00:00 | 01-01-0001 00:00:00 | 08-15-2008 23:30:00 | 0 | 3 | 591300 | 08-08-2008 23:15:33 | 08-09-2008 23:25:40 |

FIG. 6

ACTIVITY DEGREE DATABASE ~35

| USER ID | SERIES ID | FUNCTION ID | ACTIVITY DEGREE | RECORD UPDATE DATE |
|---|---|---|---|---|
| 1 | 101 | 1 | 9.8 | 08-11-2008 11:50:13 |
| 1 | 429 | 4 | 4.0 | 08-08-2008 21:08:09 |
| 1 | 435 | 1 | 4.0 | 08-08-2008 21:30:44 |
| 1 | 3 | 1 | 8.0 | 08-08-2008 21:30:46 |
| 1 | 4 | 1 | 8.0 | 08-08-2008 21:30:44 |

FIG. 7

GENRE MASTER DATABASE ~36

| GENRE ID | GENRE NAME |
|---|---|
| 103000 | Drama |
| 103100 | Japanese Drama |
| 103101 | Foreign Drama |
| 103102 | Period Drama |
| 103115 | Others |
| 106000 | Movie |
| 106100 | Foreign Movie |
| 106101 | Japanese Movie |
| 106102 | Animated Movie |
| 106115 | Others |
| 107000 | Animation/Special Effects |
| 107100 | Japanese Animation |
| 107101 | Foreign Animation |

FIG. 8

EPG MANAGEMENT DATABASE ~37

| ITEM ID | SERIES ID | START TIME | FINISH TIME | BROADCAST STATION |
|---|---|---|---|---|
| 1001 | 2 | 08-12-2008 08:00:00 | 08-12-2008 09:00:00 | 3 |
| 1100 | 2 | 08-19-2008 08:00:00 | 08-19-2008 09:00:00 | 3 |
| 1002 | 52 | 08-12-2008 09:00:00 | 08-12-2008 09:30:00 | 3 |

METHOD AND APPARATUS FOR IMAGE PROCESSING, PROGRAM, AND RECORDING MEDIUM

This is a continuation of application Ser. No. 12/553,205, filed Sep. 3, 2009, which claims priority from Japanese Application No. P2008-230321, filed Sep. 8, 2008, both of which are incorporated herein by reference.

BACKGROUND OF THE INVENTION

1. Field of the Invention

The present invention relates to an apparatus and method for information processing, a program, and a recording medium, and in particular, relates to an information processing apparatus and method capable of more appropriately performing a process for recommendation of a predetermined item, a program, and a recording medium.

2. Description of the Related Art

Recommendation systems for recommending a predetermined item, e.g., a television (TV) broadcast program are becoming widespread. The recommendation systems are broadly divided into two types, "recommendation based on user taste" and "recommendation based on short-term user interest or habit" (refer to, for example, Japanese Unexamined Patent Application Publication Nos. 2007-043471, 2007-323398, and 2004-192460).

In a related-art recommendation system based on user taste, taste of a user is learned on the basis of metadata added to an item which the user takes some kind of action on, e.g., the user viewed or bought. An item to be recommended is determined by processing, e.g., matching on the basis of the learned taste and pieces of metadata (hereinafter, "metadata blocks") added to respective items as targets to be recommended (hereinafter, "recommendation targets").

In a related-art recommendation system based on short-term user interest or habit, a next program of a serialized drama or that of a series is recommended on the basis of user habit.

In the recommendation system based on user taste, an item that matches user taste can be recommended to some extent. In some cases, however, a next program of a serialized drama or a series which the user views is not recommended properly. One of factors is that metadata added to an item provides a small amount of information, processing such as matching is performed on the basis of such small amounts of information, and a wrong item is thus selected. In some cases, when metadata added to an item which should be recommended to a user provides a small amount of information, another item provided with metadata providing a large amount of information is selected and recommended.

In the recommendation system based on short-term user interest or habit, information relating to short-term interest or habit of a user includes, for example, information indicating that the user records a program which is broadcasted from 8.00 p.m. on Monday every week. In this case, programs broadcasted from 8:00 p.m. on Monday can be recommended. If the programs broadcasted in this time zone include a next program of a serialized drama or a series, the program can be properly recommended.

However, if the serialized drama broadcasted in this time zone ends and the coming serialized drama does not match the user taste, the coming drama is recommended to the user. Furthermore, assuming that recommendation is performed using information, indicating a time zone or a broadcast station, associated with a program programmed to be recorded as a program which the user happened to be interested in, namely, a program programmed to be recorded on the basis of short-term interest, if a time zone or broadcast station associated with a program which the user is not interested in matches that of the programmed program, wrong recommendation is performed. In the above-described recommendation based on short-term interest or habit, a program that matches user taste is not necessarily recommended.

SUMMARY OF THE INVENTION

The present invention has been made in consideration of the above-described circumstances. It is desirable to enable recommendation based not only on user taste but also on short-term interest or habit.

According to an embodiment of the present invention, an information processing apparatus includes managing means for managing a scale calculated based on descriptions of an operation performed on a predetermined item and a series to which the item belongs in association with each other, first extracting means for extracting items belonging to the same series as top N series, obtained by sorting the scales, from among a plurality of items, taste managing means for managing taste of a user, second extracting means for calculating the degree of similarity between the taste managed by the taste managing means and each item to extract items with higher degrees of similarity, and recommending means for recommending a predetermined number of items among the items extracted by the first extracting means and the items extracted by the second extracting means to the user.

In this embodiment, the scale may be calculated by adding values set to respective operations of recording, viewing, and transferring the corresponding item to another apparatus.

In this embodiment, the scale may be attenuated at predetermined intervals.

In this embodiment, the apparatus may further include multiplying means for calculating a value indicating to what extent viewing in series is recommended and multiplying each of the degrees of similarity of the items, extracted by the second extracting means, by the calculated value.

According to another embodiment of the present invention, a method for information processing includes the steps of referring to information, including a scale calculated based on descriptions of an operation performed on a predetermined item and a series to which the item belongs in association with each other, stored in storing means to extract items belonging to the same series as top N series, obtained by sorting the scales, from among a plurality of items, referring to taste of a user, the taste being stored in storing means, and calculating the degree of similarity between the taste and each item to extract items with higher degrees of similarity, and recommending the extracted items to the user.

According to another embodiment of the present invention, there is provided a computer-readable program that allows a computer to execute a process including the steps of referring to information, including a scale calculated based on descriptions of an operation performed on a predetermined item and a series to which the item belongs in association with each other, stored in storing means to extract items belonging to the same series as top N series, obtained by sorting the scales, from among a plurality of items, referring to taste of a user, the taste being stored in storing means, and calculating the similarity between the taste and each item to extract items with higher degrees of similarity, and recommending the extracted items to the user.

According to another embodiment of the present invention, there is provided a recording medium that stores the above-described program.

In each of the information processing apparatus, method, and program according to the above-described embodiments, a scale calculated based on descriptions of an operation performed on a predetermined item and a series to which the item belongs are managed in association with each other, managed information is referred to, items belonging to the same series as top N series obtained by sorting the scales are extracted from among items, the degree of similarity between taste of a user and each item is calculated, items with higher degrees of similarity are extracted, and the extracted items are recommended to the user.

According to the embodiments of the present invention, items can be recommended in consideration of not only user taste but also short-term user interest or habit.

BRIEF DESCRIPTION OF THE DRAWINGS

FIG. 2 is a diagram illustrating the data structure of an operation log database;

FIG. 3 is a diagram illustrating the data structure of a user taste database;

FIG. 4 is a diagram illustrating the data structure of an item meta database;

FIG. 5 is a diagram illustrating the data structure of an item state management database;

FIG. 6 is a diagram illustrating the data structure of an activity degree database;

FIG. 7 is a diagram illustrating the data structure of a genre master database 36;

FIG. 8 is a diagram illustrating the data structure of an electronic-program-guide (EPG) management database;

DESCRIPTION OF THE PREFERRED EMBODIMENTS

Figure 1:
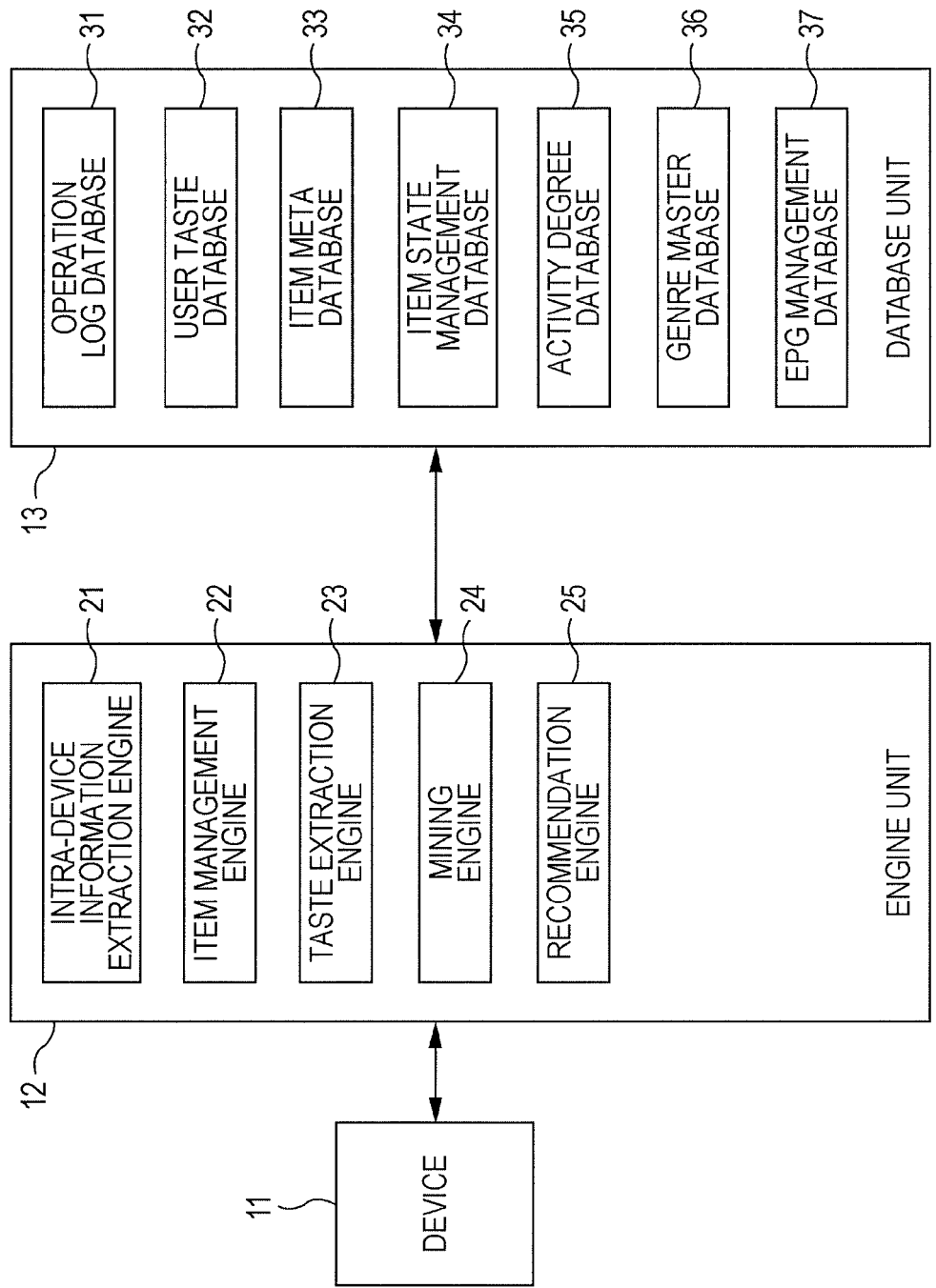
FIG. 1 is a block diagram illustrating the configuration of a system according to an embodiment of the present invention.

Preferred embodiments of the present invention will be described below.
Configuration of System FIG. 1 illustrates the configuration of a system according to an embodiment of the present invention. The system of FIG. 1 is for recommendation of a predetermined item to a user. Referring to FIG. 1, the system includes a device 11, an engine unit 12, and a database unit 13.

The device 11 is a user terminal, such as a personal computer, a television receiver, or a hard disk recorder. This embodiment will be described with respect to recommendation of a television broadcast program. Accordingly, the device 11 is capable of processing, e.g., receiving, playing, and storing a television broadcast program. In the following description, it is assumed that the device 11 is a personal computer and receives and records a television broadcast program.

The engine unit 12 includes a plurality of engines and acquires information relating to user taste and performs a process for recommendation of an item that matches the user taste. The database unit 13 stores information relating to the user taste acquired by the engine unit 12 and also stores data necessary for the engine unit 12 to execute a process for recommendation.

The device 11 and the engine unit 12 are configured to transmit and receive data (information) to/from each other. The engine unit 12 and the database unit 13 are also configured to transmit and receive data (information) to/from each other. For example, the device 11, the engine unit 12, and the database unit 13 are connected via a network so as to transmit and receive data to/from each another.

The device 11 may include the engine unit 12 and the database unit 13. Alternatively, the device 11 may include the engine unit 12 and the device 11 may be connected to the database unit 13 via the network. Furthermore, the device 11 may be connected to the engine unit 12 via the network and the engine unit 12 and the database unit 13 may constitute a single device.

The engine unit 12 includes the engines and the database unit 13 includes a plurality of databases as will be described below. The device 11 may include part of the engines and part of the databases.

The engine unit 12 includes an intra-device information extraction engine 21. Since information relating to user taste is extracted from information stored in the device 11 as will be described below, it is preferable that the intra-device information extraction engine 21 constituting the engine unit 12 be included in the device 11 in terms of security. Preferably, only the extracted information is supplied to the database unit 13.
Engines The engine unit 12 includes the intra-device information extraction engine 21, an item management engine 22, a taste extraction engine 23, a mining engine 24, and a recommendation engine 25.

The intra-device information extraction engine 21 extracts information relating to user taste from pieces of information (hereinafter, referred to as "information blocks") indicating pieces of music and mails stored (managed) in the device 11. In the case where the device 11 is a personal computer as described above, for example, the device 11 stores data blocks indicating pieces of music downloaded through the network and data blocks indicating e-mails sent and received. The pieces of music reflect user taste. For instance, when information relating to pieces of music is acquired, the user taste, e.g., user's favorite artist and genre can be obtained. Furthermore, the user taste can also be extracted from descriptions of e-mails. Accordingly, the intra-device information extraction engine 21 extracts such information stored in the device 11.

The item management engine 22 refers to an operation log database 31 constituting the database unit 13 to calculate a degree of activity (hereinafter, referred to as "activity degree") and updates an activity degree database 35. The activity degree and these databases will be described in detail below. The item management engine 22 also performs processing of updating an item state management database 34.

The taste extraction engine 23 refers to the operation log database 31 to extract the user taste and updates a user taste database 32 and an item meta database 33.

The mining engine 24 extracts the amount of feature of an item on the basis of metadata added to the item and updates the item state management database 34.

The recommendation engine 25 refers to the user taste database 32 and the item meta database 33 to determine an item to be recommended to the user.
Databases The database unit 13 includes the operation log database 31, the user taste database 32, the item meta database 33, the item state management database 34, the activity degree database 35, a genre master database 36, and an electronic-program-guide (EPG) management database 37.

The operation log database 31 manages a log relating to a user operation on the device 11. FIG. 2 illustrates the data structure of the operation log database 31. Referring to FIG. 2, the operation log database 31 manages information blocks indicating "item ID", "user ID", "log type", and "log recording date" such that the information blocks are associated with one another.

In a field named "ITEM ID", an ID assigned to each item is written. In this instance, each item is a television broadcast program. Accordingly, IDs assigned to respective programs are written. Although it is assumed that each item is a television broadcast program in the following description, items are not limited to television broadcast programs, but include a piece of music which is stored in, for example, a compact disc (CD) and is sold, a video image which is distributed via a network or is recorded in a recording medium, e.g., a digital versatile disc (DVD) and is sold, and a radio broadcast program. An item is an object or information that can be recommended to a user. An item ID is an ID by which the corresponding item can be uniquely identified.

In a field named "USER ID", an ID assigned to each user is written. In this instance, each user uses the device 11. For example, to use the recommendation system in FIG. 1, a process of identifying a user, e.g., login is performed and, after that, the user is permitted to use the system. When the process such as login is performed, a user is specified. The specified user has an assigned user ID. A component that performs the process such as login is not illustrated in FIG. 1.

In a field named "LOG TYPE", a log relating to an operation, performed by a user identified using the corresponding user ID, is written. Assuming that an item is a television broadcast program, logs to be recorded include a log indicating that the user viewed the program, a log indicating that the user recorded (or programmed to record) the program, a log indicating that the user evaluated the program after viewing (indicating a result of evaluation), a log indicating that the user retrieved information regarding the details of the program, and a log indicating that the user transferred the recorded program to a device other than the device 11. In a field named "LOG RECORDING DATE AND TIME", the date and time when a user operated the device 11 and a log was recorded is written.

As regards information blocks written in the fields in the top row of the operation log database 31 in FIG. 2, an item ID "1001", a user ID "1", a log type "Recording", and log recording date and time "12/05/2007 08:39:44" are managed in association with one another. It is understood from the associated information blocks that a user assigned the user ID "1" performed an operation of "Recording" written in the field "LOG TYPE" on an item (program) identified by the item ID "1001" at "12/05/2007 08:39:44" written in the field "LOG RECORDING DATE AND TIME".

As described above, the operation log database 31 manages data indicating an operation performed on a predetermined program by a user. Such data management enables acquisition of information indicating which item a user is recently interested in.

Although it will be described in detail below, it is assumed that there are logs indicating that a predetermined user (user A) recorded a predetermined item (item A), viewed, and then evaluated the item A as "Good". In this case, it can be determined that the user A likes programs of a genre (genre A) which the item A belongs to. In other words, a program belonging to the genre A can be preferentially recommended to the user A.

Logs written in the operation log database 31 are referred to. As will be described below, a degree of activity (also referred to as "activity degree") is a value increased in response to a user operation, such as recording or viewing. An item to be recommended is determined on the basis of such activity degrees. It is therefore possible to recommend a program related to a program in which the user is so interested as to record and/or view. Such an activity degree is set so as to be attenuated over time. Accordingly, an activity degree for an operation which has been performed before is low. Thus, a program related to a program in which the user was interested can be prevented from being recommended to the user. To take elapsed time into consideration, the operation log database 31 is configured to manage log recording date and time.

As for updating data managed by the operation log database 31, for example, adding a new operation log, the intra-device information extraction engine 21 may acquire information relating to an operation from the device 11 and perform such a process. Alternatively, a new engine (not illustrated in FIG. 1) may be provided to perform this process. Furthermore, when the device 11 performs a process for, for example, login, the device 11 may access the operation log database 31 and update an operation log.

Referring again to FIG. 1, the user taste database 32 manages information relating to user taste. FIG. 3 illustrates the data structure of the user taste database 32. Referring to FIG. 3, the user taste database 32 manages information indicating "user ID", information indicating "attribute ID", information indicating "attribute value", and information indicating "level of importance (hereinafter, importance level)" in association with one another.

In a field named "USER ID", an ID assigned to each user is written in the same way as the field "USER ID" in the operation log database 31.

In a field named "ATTRIBUTE ID", an ID indicating the attribute of information written in the next field named "ATTRIBUTE VALUE" is written. For example, when an ID indicating an attribute "drama" is written in the field "ATTRIBUTE VALUE", an ID assigned to an attribute "genre" is written in the field "ATTRIBUTE ID" because "drama" belongs to the attribute "genre". In other words, attributes include, for example, a genre, a person, and a keyword. Information blocks which can serve as attributes are previously assigned IDs. The assigned IDs are written.

In the field "ATTRIBUTE VALUE", an ID indicating each attribute value is written. As described above, IDs assigned to concrete information blocks indicating "drama" and "actor A" are written. In a field named "IMPORTANCE LEVEL", a numerical value indicating to what extent a user likes information indicated by the corresponding attribute value is written.

As regards information blocks written in the fields in the first to fifth rows from the top of the user taste database 32 in FIG. 3, a user ID "1" is associated with an attribute ID "1" (in the first row) and an attribute ID "2" (in the second to fourth rows). The attribute ID "1" is associated with an attribute value "30" and an importance level of "0.5". It is therefore understood that the attribute ID "1" indicating the attribute "genre" is associated with, for example, an attribute "action" which is assigned the attribute value "30" and belongs to the attribute "genre". Furthermore, it is determined that the user identified by the user ID "1" is interested in the genre "action" at the importance level "0.5".

In addition, it is understood that the user identified by the user ID "1" is interested in information blocks assigned attribute values "2", "4", and "3", included in the attributes identified by the attribute ID "2", at importance levels "0.3", "1.3", and "4.4", respectively.

In this case, specifically, the attribute ID "2" is associated with the attribute values "2", "4", and "52". For example, assuming that the attribute ID "2" is assigned to an attribute "person", the attribute values "2", "4", and "52" are assigned to persons, e.g., "actor A", "actor B", and "singer C", respectively. As described above, one attribute ID is associated with a plurality of attribute values. Attribute IDs and attribute values relating to user taste are written in the user taste database 32.

As described above, the user taste database 32 stores and manages information relating to user taste of each user. The user taste database 32 is updated by the taste extraction engine 23.

Referring again to FIG. 1, the item meta database 33 manages information relating to metadata added to an item. FIG. 4 illustrates the data structure of the item meta database 33. Referring to FIG. 4, the item meta database 33 manages information indicating "item ID", information indicating "attribute ID", information indicating "attribute value", information indicating "the number of updating times", and information indicating "importance level" in association with one another.

In a field named "ITEM ID", an ID assigned to each item is written in the same way as the field "ITEM ID" in the operation log database 31.

In a field named "ATTRIBUTE ID" and a field named "ATTRIBUTE VALUE", an ID assigned to each attribute and a value assigned to information included in the corresponding attribute are written in these fields in the same ways as the fields "ATTRIBUTE ID" and "ATTRIBUTE VALUE" in the user taste database 32.

In a field named "NUMBER OF UPDATING TIMES", the number of times of updating the corresponding attribute value is written. In a field named "IMPORTANCE LEVEL", an importance level of the corresponding attribute value is written. This importance level differs from that in the user taste database 32. An importance level in the user taste database 32 is for information uniquely specified by a predetermined attribute ID and an attribute value of a predetermined user. An importance level in the item meta database 33 is for information uniquely specified by a predetermined attribute ID and an attribute value of a predetermined item.

As regards information blocks in the fields in the top row of the item meta database 33 in FIG. 4, the item ID "1001", the attribute ID "1", an attribute value "153144", the number of updating times "1", and an importance level "1.5845" are managed in association with one another. In this case, the fields in the top row of the item meta database 33 in FIG. 4 describe that the attribute value of the attribute, specified by the attribute ID "1", of the item identified by the item ID "1001" is "153144", the attribute value has been updated "1" time, and the importance level of the attribute value is "1.5845".

As described above, the item meta database 33 stores and manages information blocks indicating, for example, an attribute of each item and an importance level of each attribute. The item meta database 33 is updated by the taste extraction engine 23. The taste extraction engine 23 updates the user taste database 32 and the item meta database 33. Since information blocks indicating, for example, attribute IDs managed by the user taste database 32 are the same as those by the item meta database 33, the taste extraction engine 23 is configured to update all of the information blocks in those databases at one time. Since this case is illustrative only, another engine may manage these databases.

Referring again to FIG. 1, the item state management database 34 manages information for managing item states. FIG. 5 illustrates the data structure of the item state management database 34. Referring to FIG. 5, the item state management database 34 manages information indicating "user ID", information indicating "series ID", information indicating "viewed date", information indicating "viewed broadcasted date", information indicating "programmed date", information indicating "recorded date", information indicating "broadcasted date", information indicating "the number of recording times", information indicating "accumulated value", information indicating "user update date", and information indicating "record update date" in association with one another.

In a field named "USER ID", an ID assigned to each user is written in the same way as the field "USER ID" in the operation log database 31 and that in the user taste database 32.

In a field named "SERIES ID", an ID identifying each series is written. Such a series ID is an ID that indicates a series of, for example, a TV broadcast program broadcasted as a series. The series means a series of programs, such as a drama series or a quiz show, broadcasted, for example, every week in a predetermined time zone at a predetermined channel.

Such a program, e.g., a drama series includes a predetermined number of parts. For example, a 15-part series is broadcasted as a single series. In this specification, each part of the series will be called "program" and a set of programs will be called "series". Programs constituting a drama series are assigned the same series ID. In the following description, 15 programs constituting a single series will be described as an example when necessary.

As for the series ID, cyclically broadcasted seasonal programs, called special programs, having the same content (concept) may be handled as a series and be assigned the same ID.

A program that does not constitute a series is assigned an ID indicating that the program is not included in a series. Alternatively, such a program is not assigned any series ID.

In a field named "VIEWED DATE", the date and time when a user most recently viewed a program constituting a single series is written. For example, it is assumed that a program broadcasted as the third of a 15-part series is the most recently viewed program among programs constituting the series. In this case, the date and time when the user viewed the third program is written in the field "VIEWED DATE".

In a field named "VIEWED BROADCASTED DATE", the date and time when a program, which constitutes a single series and which a user most recently viewed, was broadcasted is written. For example, it is assumed that a program broadcasted as the third of a 15-series is the most recently viewed program among programs constituting the series. In this case, the date and time when the third program wad broadcasted is written in the field "VIEWED BROADCASTED DATE".

In a field named "PROGRAMMED DATE", the date and time when a program, which constitutes a single series and which a user most recently programmed to record, was broadcasted is written. For example, it is assumed that a program broadcasted (or to be broadcasted) as the eighth of a 15-part series is the program most recently programmed to be recorded among programs constituting the series. In this case, the date and time when the eighth program was broadcasted (or is to be broadcasted) is written in the field "PROGRAMMED DATE".

In a field named "RECORDED DATE", the date and time when a most recently recorded program constituting a single series was broadcasted is written. For example, it is assumed that a program broadcasted as the sixth of a 15-part series is the most recently recorded program among programs constituting the series. In this case, the date and time when the sixth program was broadcasted is written in the field "RECORDED DATE".

In a field named "BROADCASTED DATE", the date and time when a most recently broadcasted program constituting a single series was broadcasted is written. For example, it is assumed that a program broadcasted as the seventh of a 15-part series is the most recently broadcasted program among programs constituting the series. In this case, the date and time when the seventh program was broadcasted is written in the field "BROADCASTED DATE".

In a field named "NUMBER OF RECORDING TIMES", the number of times of recording a program constituting a single series is written. For example, when it is assumed that the first to third programs of a 15-part series were broadcasted and these programs were recorded, a value "3" is written in the field "NUMBER OF RECORDING TIMES".

In a field named "NUMBER OF BROADCASTING TIMES", the number of times of broadcasting a program constituting a single series is written. For example, when it is assumed that the first to third programs of a 15-part series were broadcast, a value "3" is written in the field "NUMBER OF BROADCASTING TIMES".

In a field named "ACCUMULATED VALUE", a value obtained by adding the difference between the date and time written in the field "BROADCAST DATE" and the date and time when a program was broadcast is written.

In a field named "USER UPDATE DATE", the date and time when a user most recently operated the device 11 is written. For example, when the most recently user operation is programming to record a program, the date and time when the recording programming operation was performed is written in the field "USER UPDATE DATE".

In a field named "RECORD UPDATE DATE", the date and time when the above-described information managed by the item state management database 34 was updated is written.

As regards information blocks in the top row of the item state management database 34 in FIG. 5, the user ID "1", a series ID "2", viewed date "08-11-2008 10:41:16", viewed broadcasted date "01-01-0001 00:00:00", programmed date "08-12-2008 13:00:00", recorded date "08-11-2008 03:10:00", broadcasted date "08-16-2008 02:55:00", the number of recording times "4", the number of broadcasting times "36", an accumulated value "80229", user update date "08-11-2008 11:50:13", and record update date "08-11-2008 06:17:21" are associated with one another.

In this case, if it is difficult to write the date and time because, for example, the user has not viewed a program yet, information indicating the fact, for example, "01-01-0001 00:00:00" is written.

As described above, the item state management database 34 manages information blocks indicating item states for each user in association with one another. The item state management database 34 is updated by the item management engine 22.

Referring again to FIG. 1, the activity degree database 35 manages activity degrees. FIG. 6 illustrates the data structure of the activity degree database 35. Referring to FIG. 6, the activity degree database 35 manages information indicating "user ID", information indicating "series ID", information indicating "function ID", information indicating "activity degree", and information indicating "record update date" in association with one another.

In this instance, the degree of activity (activity degree) is an index to measure user's interest or taste at that time. A predetermined operation performed on an item, e.g., viewing or recording a predetermined program, transferring the program to another device, or deleting the recorded program, is performed because a user is interested in the program for some reason.

In consideration of the above fact, user taste can be obtained on the basis of which item a user operated and which operation the user performed on the item. For example, assuming that the user recorded a predetermined item and viewed the item, the user may be very interested in the item and the item can reflect the user taste at that time. Accordingly, the activity degree is regarded as an index indicating user taste obtained from a predetermined user operation on a predetermined item.

The activity degree is calculated by the item management engine 22. The item management engine 22 calculates each activity degree in the activity degree database 35 using information managed by the item state management database 34. An activity degree is previously set for each predetermined operation. A set value is added every time an operation is performed on each item. For example, it is assumed that two points are set for recording and one point is set for viewing. If a predetermined item was recorded and was then viewed, the activity degree for the item is calculated as three points (=2+1). The calculated activity degree is written in the activity degree database 35.

An activity degree is set so that the value is attenuated over time. As will be described below, the activity degrees are mainly used to recommend an item that reflects short-term user interest or habit. Since the activity degrees are used in this manner, an activity degree which has not been updated for a certain amount of time is set to a small value so as not to significantly affect item recommendation.

For example, information indicating record update date (which will be described later) in the activity degree database 35 is checked at predetermined intervals T1 to detect an activity degree which has not been updated for a period of time equivalent to the predetermined interval T1 or longer. The detected activity degree is multiplied by an attenuation constant V. Such processing is performed at the predetermined intervals T1, so that the activity degree is attenuated over time.

The activity degree database 35 will now be described below. In a field named "USER ID", an ID assigned to each user is written in the same way as the field "USER ID" in each of the operation log database 31, the user taste database 32, and the item state management database 34.

In a field named "SERIES ID", a series ID is written in the same way as the field "SERIES ID" in the item state management database 34.

In a field named "FUNCTION ID", an ID assigned to each function is written. In this instance, the function indicates a type of recommendation. Examples are as follows. According to a first type of recommendation, user taste is determined and a program to be automatically recorded is recommended. According to a second type of recommendation, viewing a recorded program is recommended. According to a third type of recommendation, deleting a recorded program is recommended. An activity degree of each function is updated on the basis of a user operation. As described above with respect to the operation log database 31, user operations include program viewing, program recording (recording programming), program evaluation, retrieval of information regarding the details of a program, and transfer of a recorded program to a device other than the device 11.

When a user performs such an operation, information indicating the operation is written in the field "LOG TYPE" in the operation log database 31. Accordingly, the corresponding activity degree is updated on the basis of the information written in the field "LOG TYPE". User operations used for updating an activity degree of each function are predetermined. When an operation is performed, for example, when an operation log is written, the activity degree of the corresponding function is updated.

A table (not illustrated) including function IDs and operations in association with each other may be provided separately and be managed. Accordingly, when a user wants to, for example, add, change, or delete an operation item, a function ID can be added, changed, or deleted in response to such a process. Consequently, versatility can be increased and management can be easily performed.

In a field named "ACTIVITY DEGREE", an activity degree is written. Since the activity degree is a value updated in response to a user operation, a field named "RECORD UPDATE DATE" is provided so that the date on which a record was updated is written.

As regards information blocks in the top row of the activity degree database 35 in FIG. 6, the user ID "1", a series ID "101", a function ID "1", an activity degree "9.8", record update date "08-11-2008 11:50:13" are managed in association with one another. It is understood from these information blocks that the activity degree associated with the user assigned the user ID "1" is "9.8" for recommendation of a type assigned the function ID "1" indicating, for example, automatic recording of a program constituting a series assigned the series ID "101". In other words, this means that the degree of recommendation for automatic recording of the series assigned the series ID "101" is "9.8".

As described above, the activity degree database 35 manages activity degrees of functions for respective series. The activity degree database 35 is updated by the item management engine 22.

With reference again to FIG. 1, the genre master database 36 manages a list of genres (hereinafter, referred to as "series-viewing recommendation genres") in each of which it is preferable to successively view a series from the first part (program) of the series. Referring to FIG. 7, the genre master database 36 manages information indicating "genre ID" and information indicating "genre name" in association with each other.

In a field named "GENRE ID", an ID assigned to each genre is written. In a field named "GENRE NAME", the name of a genre corresponding to each genre ID is written.

As regards information blocks in the top row of the genre master database 36 in FIG. 7, a genre ID "103000" and a genre name "drama" are managed in association with each other. In this case, a program (series) belonging to the genre name "drama" assigned the genre ID "103000" is managed as an item belonging to a recommended genre in which a user should view a series from the first part (program).

Referring again to FIG. 1, the EPG management database 37 manages data relating to an EPG. FIG. 8 illustrates the data structure of the EPG management database 37. Referring to FIG. 8, the EPG management database 37 manages information indicating "item ID", information indicating "series ID", information indicating "start time", information indicating "finish time", and information indicating "broadcast station" in association with one another.

In a field named "ITEM ID", an ID assigned to each item is written in the same way as, for example, the field "ITEM ID" in the item meta database 33. In a field named "SERIES ID", an ID assigned to each series is written in the same ways as, for example, the field "SERIES ID" in the item state management database 34.

In a field named "START TIME", the time of start of an item, i.e., a broadcast program is written. In a field named "FINISH TIME", similarly, the time of finish of the broadcast program is written. In a field named "BROADCAST STATION", a broadcast station (channel number) broadcasting the program is written.

As regards information blocks in the top row of the EPG management database 37 in FIG. 8, the item ID "1001", the series ID "2", start time "08-12-2008 08:00:00", finish time "08-12-2008 9:00:00", and a broadcast station "3" are managed in association with one another.

As for information stored in the EPG management database 37, metadata of an item is acquired and information included in the metadata is written. In this embodiment, since it is assumed that a series ID is information (included in metadata) constituting an EPG, it is also assumed that metadata is acquired and is written in the EPG management database 37. In this case, a site which produces an EPG assigns a series ID. Alternatively, a site which manages the EPG management database 37 may assign a series ID and write information in the EPG management database 37.

As described above, the EPG management database 37 manages data obtained from an EPG.

The database unit 13 (refer to FIG. 1) includes the above-described databases. A process performed using the databases in the database unit 13 by the engine unit 12, particularly, a process for recommendation will be described below.

Process for Recommendation

As for examples of recommendation, a user is recommended to view a program which is being broadcasted, the user is recommended to record a program to be broadcasted, the user is recommended to view any of recorded programs, and the user is recommended to delete any of recorded programs. In addition, when the user transfers a program recorded in the device 11 to another device, e.g., a portable device (hereinafter, referred to as "portable terminal") including a display unit capable of displaying an image, a program suitable for transfer is recommended to the user. Furthermore, in such transfer, when the user intends to transfer a plurality of programs but a portable terminal as a transfer destination has a small storage capacity and it is difficult to transfer all the programs, a program which is not transferred is recommended to the user.

Figure 9:
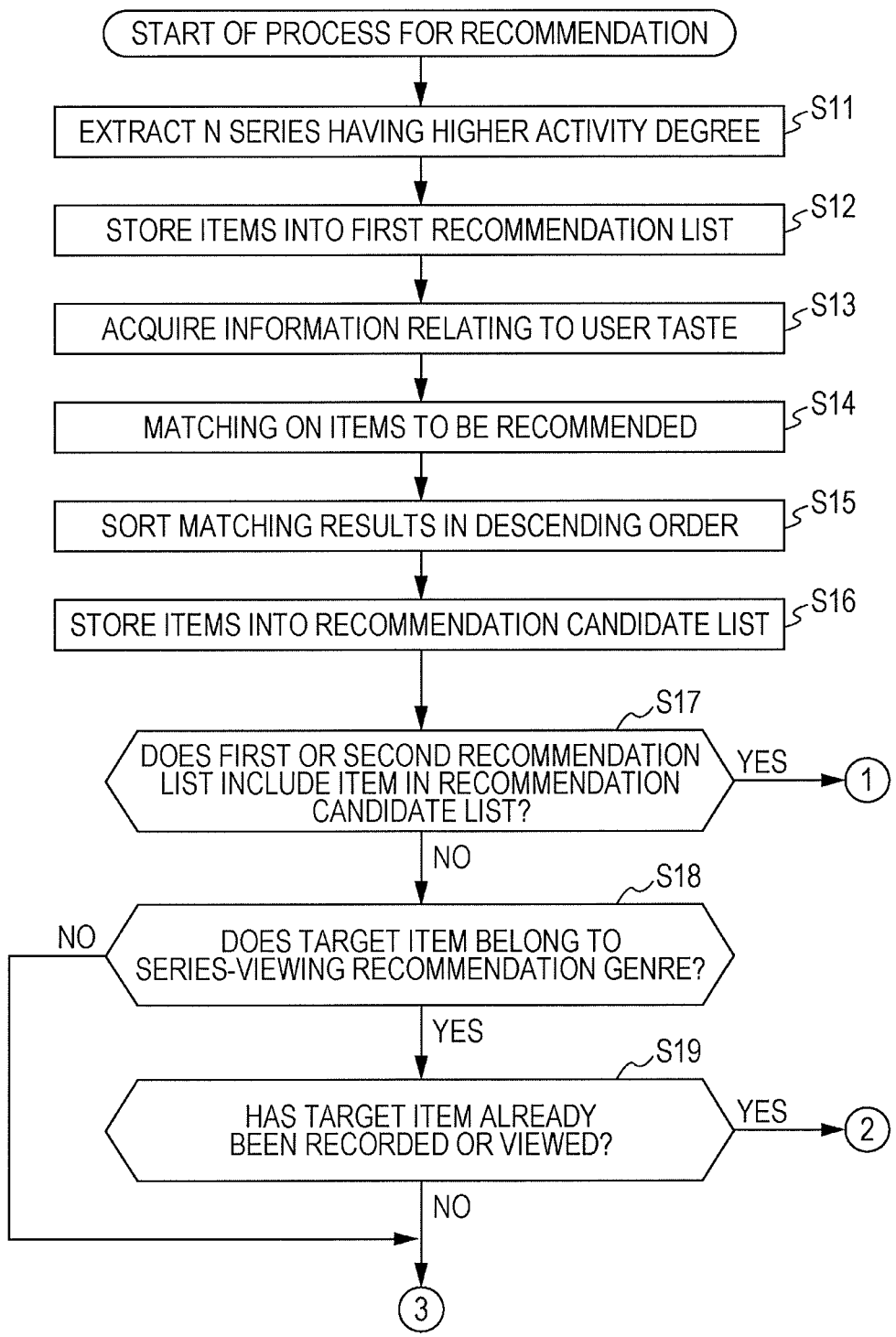
FIG. 9 is a flowchart explaining a process for recommendation.
Figure 10:
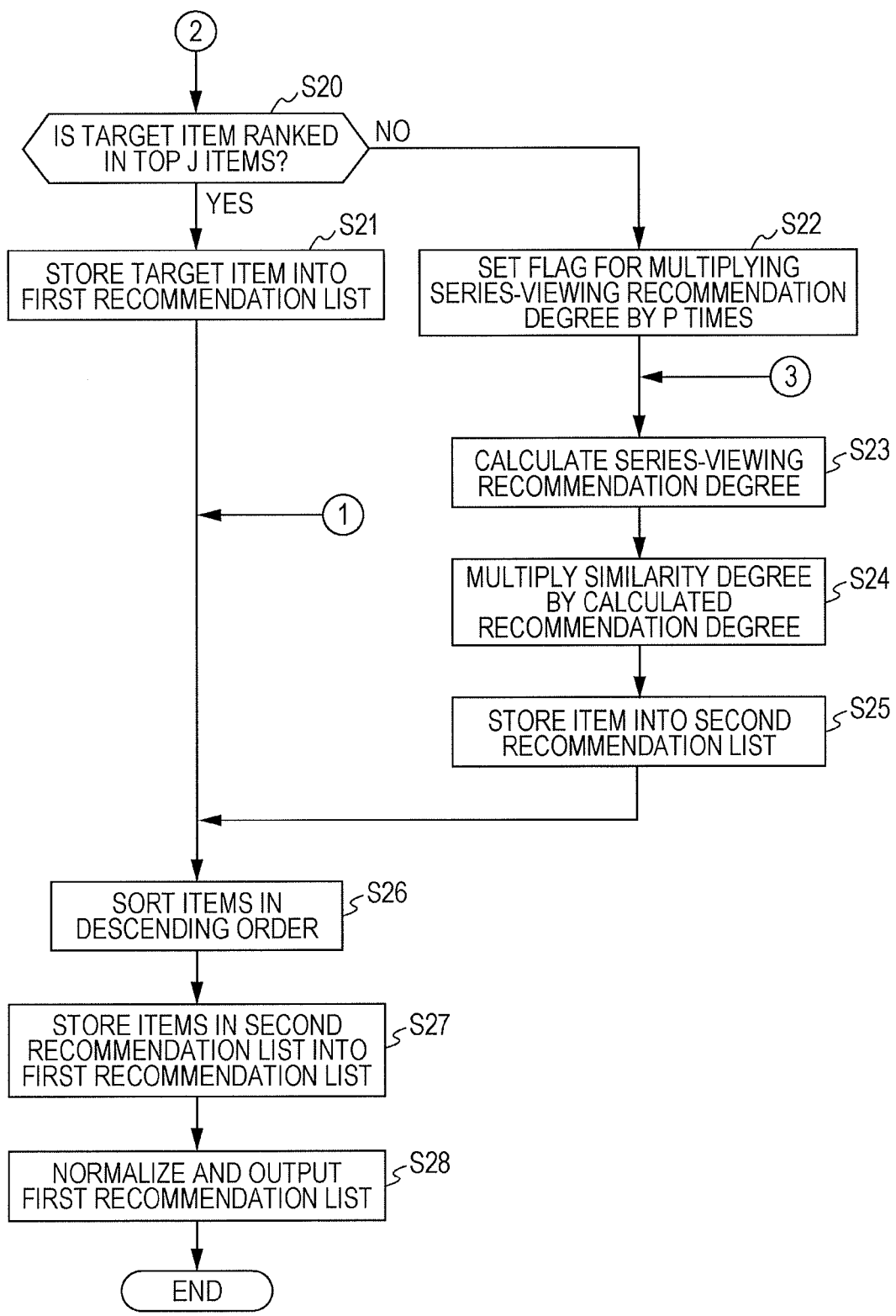
FIG. 10 is the flowchart explaining the process for recommendation.

As for the above-described recommendations, recommendations (for viewing and recording) other than recommendation for deletion have the same basic process flow. The basic process flow will be described with reference to a flowchart shown in FIGS. 9 and 10. The recommendation for deletion will be described later with reference to a flowchart of FIG. 11. A process for recommendation, i.e., the process which will be described with reference to FIGS. 9 and 10 is performed by the recommendation engine 25 (see FIG. 1).

In step S11, the recommendation engine 25 extracts a plurality of series with higher activity degrees. Specifically, the recommendation engine 25 refers to the activity degree database 35 (see FIG. 6) to read out, for example, top N activity degrees associated with a user ID assigned to a target user (to whom a program is to be recommended) from the activity degree database 35. In this case, the top N activity degrees are N higher activity degrees. If a value indicating an activity degree is lower as the activity degree is higher, bottom-N activity degrees are read out from the bottom of activity degrees.

Information to be read out from the activity degree database 35 includes series IDs associated with the top N activity degrees. Since such processing is performed, information blocks may be updated, e.g., sorted in order of ascending/descending activity degree upon updating the activity degree database 35. The information blocks in the activity degree database 35 may be sorted in ascending/descending activity degree at any time.

In step S12, items are stored in a first recommendation list. When a program to be recorded is recommended or a program to be viewed is recommended from among programs which are being broadcasted at that time, programs which will be broadcasted or are being broadcasted are targets. In this case, the EPG management database 37 is referred to and programs having the same series IDs as the N series IDs extracted in step S11 are stored into the first recommendation list.

When a program to be viewed is recommended from among recorded programs, programs recorded in the device 11 are targets. The item state management database 34 is referred to. Programs having the same series IDs as the N series IDs extracted in step S11 are stored into the first recommendation list. Explanation will be made assuming that a program to be recorded is recommended.

In step S13, information relating to taste of the target user is acquired. The recommendation engine 25 refers to the user taste database 32 to read out information associated with the user ID assigned to the user who is the target at that time.

In step S14, matching is performed on the items as recommendation targets. The recommendation target items are programs which will be broadcasted later than that time. Matching specifically means calculation of the degree of similarity between the user taste and each recommendation target item.

As for methods of calculating the degree of similarity, the degree of similarity can be appropriately obtained using any of various methods, e.g., the inner product between two vectors, cosine measure, and Euclidean distance. The explanation will be made using the inner product as an example.

When "a" indicates an attribute included in a group A among attributes of an item, "Wa" indicates the weight of the attribute "a", "Xa" denotes an attribute "a" of the user taste, and "Ya" denotes an attribute "a" of a recommendation target item, the degree of similarity between the user taste and the recommendation target item can be calculated using the following expression.

$$sim(X, Y) = \sum_{a \in A} (|X_a \cdot Y_a| \times w_a) \quad (1)$$

After the degree of similarity of each of the items is calculated, the results of matching are sorted in descending order in step S15. In other words, if a value indicating the degree of similarity (hereinafter, also referred to as "similarity degree") is larger as the degree of similarity is higher, the items subjected to matching are sorted (arranged) in order from highest similarity to lowest.

The sorted items are stored into a recommendation candidate list in step S16. The recommendation candidate list may store all of recommendation target items or only items each having a similarity degree higher than or equal to a threshold value.

In step S17, a determination is made as to whether an item in the recommendation candidate list is stored in the first recommendation list or a second recommendation list. Processing in step S17 and the subsequent steps is performed on each item stored in the recommendation candidate list. Accordingly, in step S17, any one of the items stored in the recommendation candidate list is a target to be processed. Whether the target item is stored in the first or second recommendation list is determined in step S17.

Processing in step S17 is determination for preventing each item stored in the recommendation candidate list from being stored in the first or second recommendation list, namely, preventing duplication of each item in the recommendation candidate list.

When it is determined in step S17 that the target item in the recommendation candidate list is also stored in the first or second recommendation list, the process proceeds to step S26 (see FIG. 10). If not, the process proceeds to step S18.

In step S18, a determination is made as to whether the target item is a program of a series-viewing recommendation genre. This determination is performed on the basis of whether the genre ID assigned to the target item is registered in the genre master database 36. For example, when matching is performed in step S14, the genre ID is acquired as a piece of information associated with the item and processing in step S18 is performed using the acquired genre ID. As for the information associated with the item, for example, metadata of a program is used. The metadata may be acquired from a server upon matching. Alternatively, the metadata may be previously stored in the EPG management database 37 and be acquired from the EPG management database 37 upon matching.

When it is determined in step S18 that the target item is a program of a series-viewing recommendation genre, the process proceeds to step S19. In step S19, a determination is made as to whether the corresponding series has already been recorded or viewed. Description will be made assuming that it is determined that the series has already been recorded or viewed. If an item is to be bought, namely, a pay broadcasting program is a target item to be processed, whether the target item has already been bought is one of determination factors.

The processing in step S19 is performed with reference to the item state management database 34. Specifically, a determination is made as to whether the series ID matching that assigned to the target item is managed in the item state management database 34. When it is determined that the series ID is managed in this database, the viewed date or recorded date associated with the series ID is referred to, thus performing the processing in step S19.

When it is determined in step S19 that the series which the target item belongs to has already been recorded or viewed, namely, the user has viewed or recorded at least one of programs constituting the series, the process proceeds to step S20 (see FIG. 10).

In step S20, a determination is made as to whether the target item is ranked in the top J items in the recommendation candidate list. When it is determined in step S20 that the target item is ranked in the top J, the process proceeds to step S21. In step S21, the target item in the recommendation candidate list is stored into the first recommendation list.

Processing in step S21 is performed when it is determined in step S17 that the target item is not stored. Accordingly, the target item is not stored in the first recommendation list. In addition, the target item is determined as a program recommended to be viewed in series in step S18. Furthermore, the target item is determined as the item (program) which the user has already viewed or recorded, namely, the item which the user is interested in. In other words, it is determined on the basis of the results in steps up to step S19 that the user is a little interested in the series which the target item belongs to. If the series does not match the user taste, it is determined that the user is interested in the target item at that time, namely, for a short term.

In the processing steps up to step S19, an item that matches short-term user taste is detected. In step S20, the determination is made on such an item, namely, whether the item is ranked in the top J items is determined. This processing is detection of an item that matches user taste. In other words, this processing is for detection of an item that matches long-term user state.

When the process proceeds to step S21 after the above determination, this proceeding means that the target item is determined as an item that matches both of the short-term user taste and the long-term user taste. According to this embodiment, such an item that reflects short-term user taste can be detected.

Whereas, when it is determined in step S20 that the target item is not ranked in the top J items in the recommendation candidate list, the process proceeds to step S22. In step S22, a flag for multiplying a degree of series-viewing recommendation (hereinafter, "series-viewing recommendation degree") by P times is set. The series-viewing recommendation degree is calculated in step S23. The flag to multiply a value indicating the recommendation degree by P times in step S24 is set in step S22.

When it is determined that the target item matches short-term user taste but does not match long-term user taste, the process proceeds to step S22. Accordingly, the flag to increase the recommendation degree in the following step is set so that the recommendation degree reflects the fact that the corresponding item matches short-term taste.

When it is determined that the target item is determined as an item which does not belong to the series-viewing recommendation genre, alternatively, when it is determined in step S19 that the target item has not been recorded or viewed yet, the process proceeds to step S23.

In step S23, the series-viewing recommendation degree is calculated. The series-viewing recommendation degree is a numerical value indicating to what extent the corresponding target item should be viewed in series. The recommendation degree is calculated in the following expression.

$$viewWeight = \alpha \cdot ActiveDegree + \beta \cdot \frac{RecordNum}{BroadcastNum} + \gamma \cdot \left(\frac{LastRecordBroadcastDate}{NowDate}\right) + w \quad (2)$$

In Expression (2), "veiwWeight" denotes the series-viewing recommendation degree. In the first term, "ActiveDegree" indicates the degree of activity written in the activity degree database 35. In the second term, "RecordNum" denotes a value written in the field "NUMBER OF RECORDING TIMES" in the item state management database 34 and "BroadcastNum" indicates a value written in the field "NUMBER OF BROADCASTING TIMES" in the item state management database 34. In the third term, "LastRecordBroadcastData" denotes a value written in the field "ACCUMULATED VALUE" in the item state management database 34 and "NowDate" indicates the date and time of calculation. "α" in the first term, "β" in the second term, and "γ" in the third term each denote a coefficient. The fourth term "w" indicates the default of "viewWeight".

The series-viewing recommendation degree is calculated using Expression (2). Before calculation using Expression (2), a determination may be made as to whether the item is being viewed. When it is determined that the item is being viewed, the series-viewing recommendation degree may be obtained by multiplying the value obtained using Expression (2) by a constant ϵ.

After the series-viewing recommendation degree is calculated in step S23, the similarly degree (calculated in step S14) of the target item is multiplied by the series-viewing recommendation degree in step S24. Furthermore, in the case where the flag is set in the item in step S22, the product is multiplied by P times. The final recommendation degree is calculated in this manner. In step S25, the item with the calculated recommendation degree is stored into the second recommendation list.

Processing in steps S17 to S25 is repeatedly performed on each of the items in the recommendation candidate list. When processing of all the items is finished, the recommendation degrees of all the items in the second recommendation list are stored.

After that, in step S26, the items stored in the second recommendation list are sorted in order of descending recommendation degree. In step S27, the items stored in the second recommendation list are stored into the first recommendation list. At that time, only k items with higher recommendation degrees in the second recommendation list are stored into the first recommendation list.

Assuming that many items have already been stored in the first recommendation list, when items in the second recommendation list are added to the items in the first recommendation list, the items in the first recommendation list are further increased. On the contrary, assuming that few items are stored in the first recommendation list, even when items in the second recommendation list are added to the items in the first recommendation list, the state of the first recommendation list is not so changed. In some cases, the number of items stored in the first recommendation list is small. Since items stored in the first recommendation list are to be recommended to the user, the number of items recommended is preferably not so many but not so few. It is preferable to store an appropriate number of items in the first recommendation list.

Accordingly, when the items stored in the second recommendation list are stored into the first recommendation list in step S27, the number of items moved from the second recommendation list to the first recommendation list may be determined in consideration of the number of items which have already been stored in the first recommendation list. Specifically, when the above-described "k" denotes a variable and L indicates the number of items to be finally stored in the first recommendation list, the number of items stored in the first recommendation list at that time is expressed as (L−k). Only k items may be moved from the second recommendation list to the first recommendation list.

After the items stored in the second recommendation list are added to those in the first recommendation list in the above-described manner, the first recommendation list is normalized and is output in step S28. As for normalization, for example, the items are sorted in order of descending recommendation degree. The sorted items are sequentially recommended to a user. Recommendation specifically means providing information, corresponding to an item, in text, image, and/or audio form to a user.

Such a recommended item is stored in the first recommendation list. Specifically, items stored in the first recommendation list are stored by performing processing in steps S11 and S12. The items stored in the first recommendation list by processing in steps S11 and S12 are programs of respective series which the user has repetitively recorded or viewed.

These items are items which the user is interested in at that time. In other words, the items are extracted on the basis of short-term user taste.

In addition, since such an item is extracted on the basis of the activity degree, the item reflects user habit at that time, for example, the user records a program broadcasted at 8:00 a.m. on Monday and, after that, the user views the program. In other words, an item to be recommended is determined using activity degrees, so that an item can be extracted in consideration of user habit. As described above, according to the recommendation of the present embodiment, an item that matches short-term user taste or habit can be recommended to the user.

The items stored in the recommendation candidate list are selected based on user taste. The taste is indicated by stored information. Accordingly, the taste is continuous or long-term taste. Items reflecting the long-term taste are selected on the basis of the short-term taste and are then moved to the first recommendation list. Thus, the items reflecting both of the long-term taste and the short-term taste can be recommended to the user.

According to the process described with reference to the flowchart shown in FIGS. 9 and 10, items reflecting short-term user taste or habit are preferentially recommended by performing processing in steps S11 and S12. In other words, the top N items to be recommended to the user are based on short-term user interest or habit.

In step later than steps S11 and S12, for example, step S23, processing is performed using a concept "series" so that the degree of recommendation of a program (item) constituting a series is increased. Since an item constituting a series that the user is interested in is to be recommended, an item based on the short-term user taste or habit can be recommended only by the above-described processing.

Figure 11:
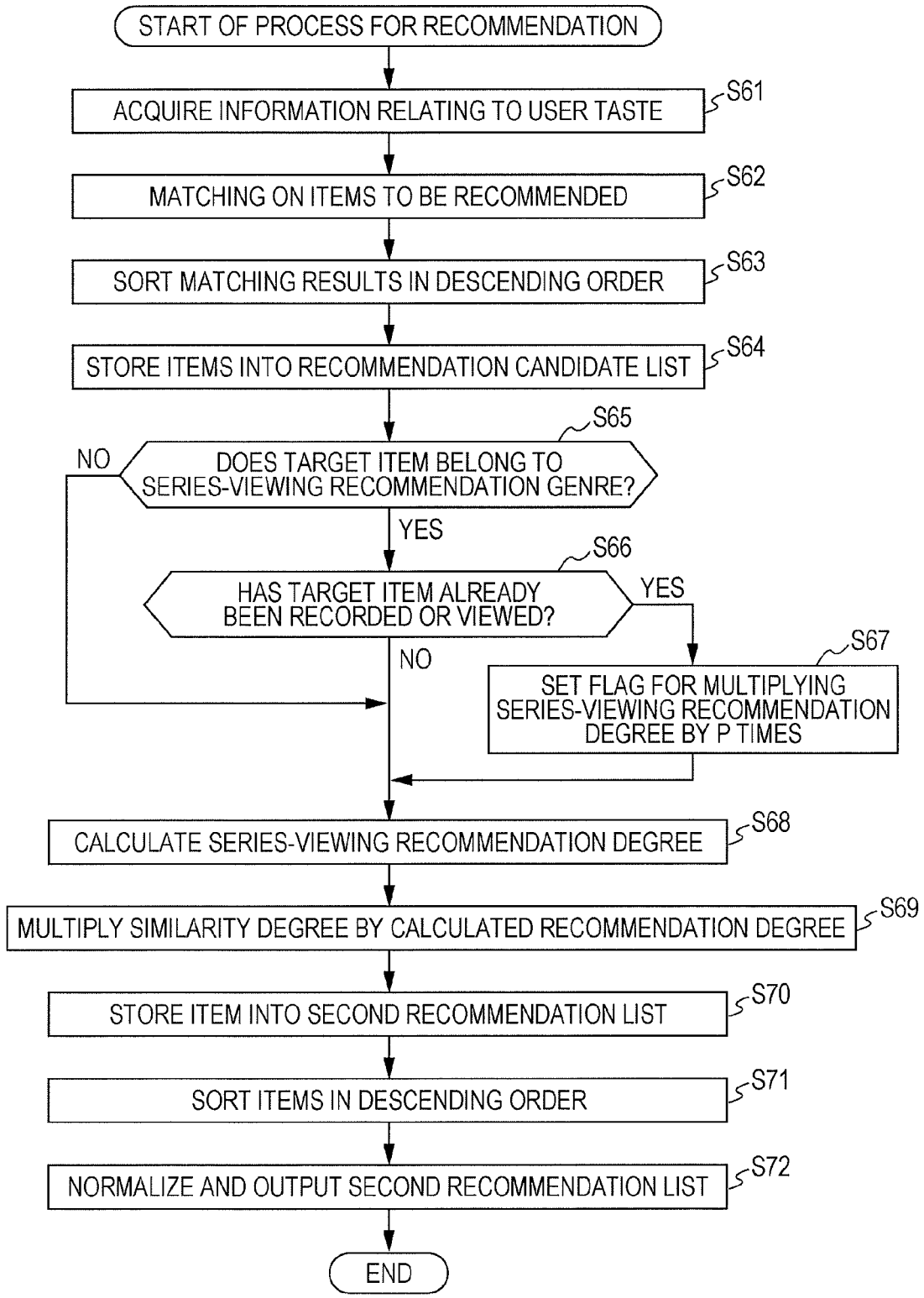
FIG. 11 is a flowchart explaining another process for recommendation.

In the process for recommendation, therefore, steps S11 and S12 in FIG. 9 may be omitted and the process may be started from step S13. A process made in consideration of the above-described situation will be described with reference to a flowchart of FIG. 11. Processing steps of the flowchart in FIG. 11 are performed in a manner similar to those of the flowchart in FIGS. 9 and 10. Accordingly, equivalent steps are illustrated in FIG. 11 and detailed descriptions of the steps are appropriately omitted.

In step S61, information relating to user taste is acquired. In step S62, matching is performed on recommendation target items. In step S63, the items are sorted in order of descending similarity degree on the basis of the results of matching. In step S64, these items are stored in the recommendation candidate list.

Processing in steps S61 to S64 is performed in a manner similar to that in steps S13 to S16 in FIG. 9. In the process illustrated in FIG. 11, the first recommendation list is not used. In order to agree with the description with reference to the flowchart in FIGS. 9 and 10, however, the list described as the second recommendation list in the flowchart in FIGS. 9 and 10 will also be referred to as the second recommendation list in the flowchart of FIG. 11.

In step S65, a determination is made as to whether a target item belongs to a series-viewing recommendation genre. When it is determined that the item belongs to the series-viewing recommendation genre, the process proceeds to step S66. If not, the process skips steps 66 and 67 and proceeds to step S68.

Steps S65 and S66 correspond to steps S18 and S19 in FIG. 9, respectively.

When it is determined in step S66 that an item belonging to the same series as that the target item belongs to has already been recorded or viewed, the process proceeds to step S67. In step S67, a flag for multiplying the series-viewing recommendation degree by P times is set. After the flag is set, the process proceeds to step S68. Step S67 corresponds to step S22 in the flowchart of FIG. 10.

In step S68, a series-viewing recommendation degree of the target item is calculated. In step S69, the similarity degree of the target item is multiplied by the series-viewing recommendation degree. Upon processing in step S69, multiplying the series-viewing recommendation degree by P times is also performed on an item subjected to processing in step S67, namely, the item with the set flag. In step S70, the resultant recommendation degree is associated with the item and is then stored into the second recommendation list. Steps S68 to S70 correspond to steps S23 to S25 in the flowchart of FIG. 10, respectively.

In step S71, items stored in the second recommendation list are sorted in order of descending recommendation degree. In step S72, the second recommendation list is normalized and the recommended items are provided to the user. Steps S71 and S72 correspond to steps S26 and S28 in the flowchart of FIG. 10, respectively.

According to the above-described process, whether a target item is an item belonging to a series or an item which the user has already recorded or viewed is determined by processing in steps S65 to S69. Thus, an item can be extracted in consideration of short-term user taste or habit.

According to the process illustrated in the flowchart of FIG. 11, therefore, items that reflect both of long-term taste and short-term taste can be recommended to the user.

Process for Deletion Recommendation

A process for deletion recommendation will now be described. In deletion recommendation, for example, when the remaining storage capacity of the device 11 is small and any stored item is deleted in order to increase the storage capacity, an item that may be deleted is recommended to a user. Another deletion recommendation is as follows. When a plurality of items are intended to be moved from the device 11 to another device, it is difficult to move all of specified items because the remaining storage capacity of the other device is not enough to receive the specified items. In this case, an item to be deleted from a list including target items is recommended.

Figure 12:
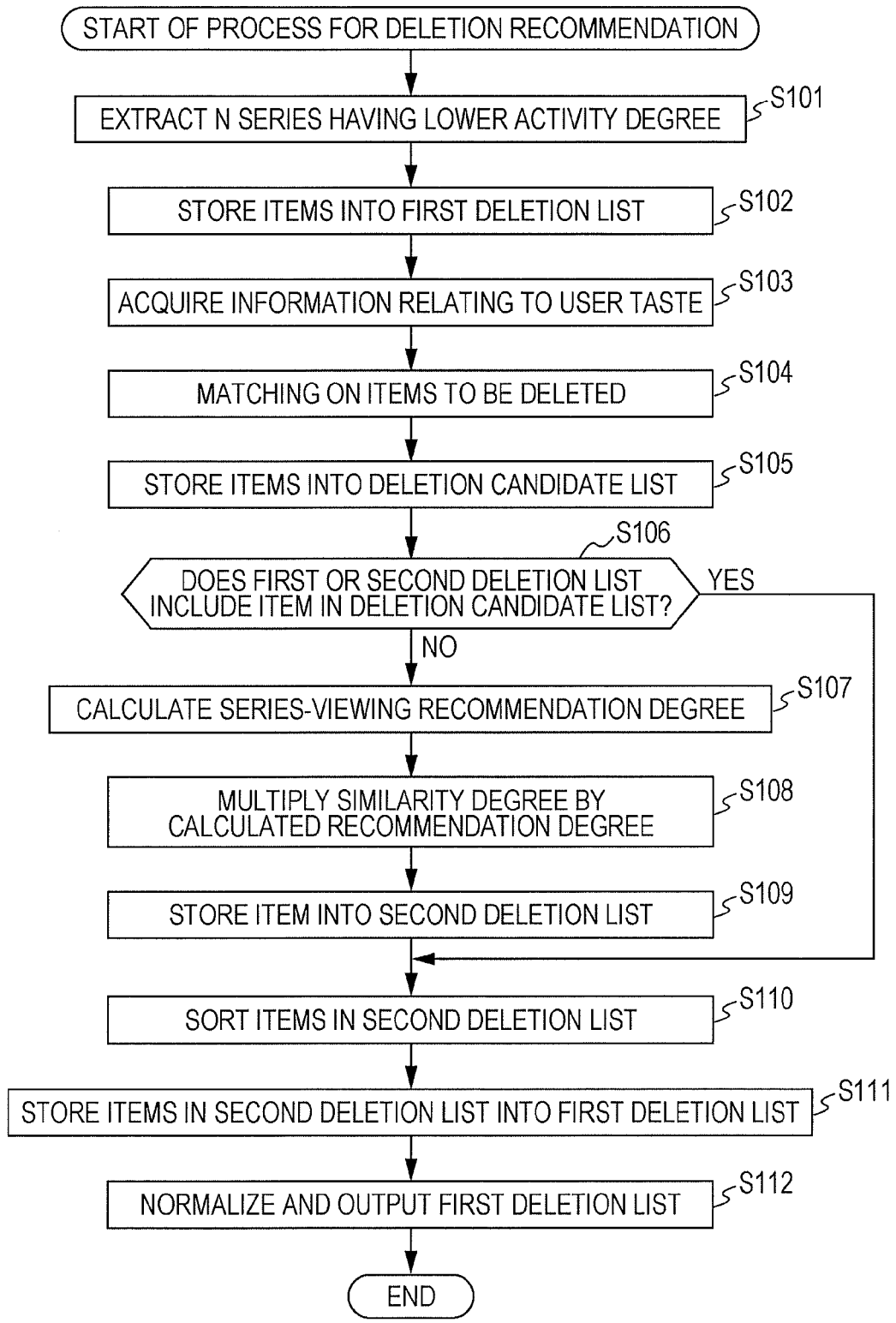
FIG. 12 is a flowchart explaining another process for recommendation.

A process for such deletion recommendation will now be described with reference to a flowchart of FIG. 12.

In step S101, the recommendation engine 25 extracts a plurality of series with higher activity degrees associated with a function "deletion recommendation". Specifically, the recommendation engine 25 sorts activity degrees associated with a user ID assigned to a target user (to whom a program is recommended) and associated with a function ID assigned to the function "deletion recommendation" in descending order, and then refers to the activity degree database 35 (see FIG. 6) to read out top N series with higher activity degrees. In this case, each series with a higher activity degree associated with deletion recommendation is determined as a series that the user is not interested in. This process is for extraction of an item to be deleted. Accordingly, processing of extracting a series that the user is not interested in is performed in step S101.

In step S102, items are stored into a first deletion list. The stored items are deletion target programs. When a recorded item is deleted, items stored in the device 11 are deletion target programs. Alternatively, when an item to be moved is specified and the specified item is to be deleted first, the specified item is a deletion target program.

In either case, a deletion target is an item stored in the device 11. Accordingly, programs stored in the device 11 serve as target items and the item state management database 34 is referred to. Programs having the same IDs as those of the N series extracted in step S101 are stored into the first deletion list.

In step S103, information relating to taste of the target user is acquired. The recommendation engine 25 refers to the user taste database 32 to read out information associated with the user ID assigned to the target user at that time.

In step S104, matching between each deletion target item and the user taste is performed. A matching target item is an item stored in the device 11. Matching can be performed in the same way as matching in step S14 in the flowchart of FIG. 9. In this matching, the degree of similarity between the user taste and the deletion target item is calculated.

After the similarity degrees are calculated, the items associated with the calculated similarity degrees are stored into a deletion candidate list in step S105. All the deletion target items may be stored in the deletion candidate list. Alternatively, an item associated with a similarity degree lower than or equal to a threshold value, namely, an item determined as an item that does not match the user taste may be stored in this list.

In step S106, a determination is made as to whether an item in the deletion candidate list has already been stored in the first deletion list or a second deletion list. Processing in step S106 and the subsequent steps is performed on each of the items stored in the deletion candidate list. In step S106, therefore, one of the items stored in the deletion candidate list is a target to be processed. Whether the target item has already been stored in the first deletion list or the second deletion list is determined.

When it is determined in step S106 that the target item stored in the deletion candidate list is also stored in the first deletion list or the second deletion list, the process skips steps 107 to S109 and proceeds to step S110. If not, the process proceeds to step S107.

In step S107, a series-viewing recommendation degree is calculated. The series-viewing recommendation degree is a numerical value indicating to what extent the corresponding target item should be viewed in series and is calculated using Expression (2) described above. Since Expression (2) has been described in the explanation regarding step S23 in the flowchart of FIG. 10, the detailed description of Expression (2) is omitted.

After the series-viewing recommendation degree is calculated in step S107, the similarity degree (calculated in step S104) of the target item is multiplied by the recommendation degree in step S108. The resultant recommendation degree is stored in the second deletion list in association with the target item.

Processing in steps S106 to S109 is repeatedly performed on each of the items stored in the deletion candidate list. After processing of all the items is finished, the recommendation degrees associated with all the items stored in the deletion candidate list are stored in the second deletion list.

In this state, in step S110, the items stored in the second deletion list are sorted in order of descending recommendation degree. Since the process is to extract an item that should be recommended as suitable to be deleted, an item associated with a higher recommendation degree is a target item. Accordingly, in step S110, the items in the second deletion list are sorted in order of descending recommendation degree.

In step S111, the items stored in the second deletion list are stored into the first deletion list. At that time, k items associated with lower recommendation degrees are stored into the first deletion list. The value "k" may be set to a variable depending on the number of items stored in the first deletion list in the same case as processing in step S27 in FIG. 10.

After the items stored in the second deletion list are added to those in the first deletion list, the first deletion list is normalized and is output in step S112. As for normalization, for example, the items in the first deletion list are sorted in order of ascending recommendation degree. The sorted items are sequentially recommended to the user.

According to this process, an item that does not match the user taste can be recommended as a deletion target.

As described above, according to the present embodiment, recommendation based on short-term interest or habit can be performed. In addition, such recommendation can provide the user an opportunity to, for example, record or view a program. Furthermore, the user's taste can be expanded. Additionally, recommendation tailored to user taste can also be performed.

The above-described series of processing steps can be executed by hardware or software. When the above-described series of processing steps is executed by software, a program constituting the software is installed from a program recording medium into a computer incorporated in dedicated hardware or into a multi-purpose personal computer which is capable of executing various functions by installing various programs.

Figure 13:
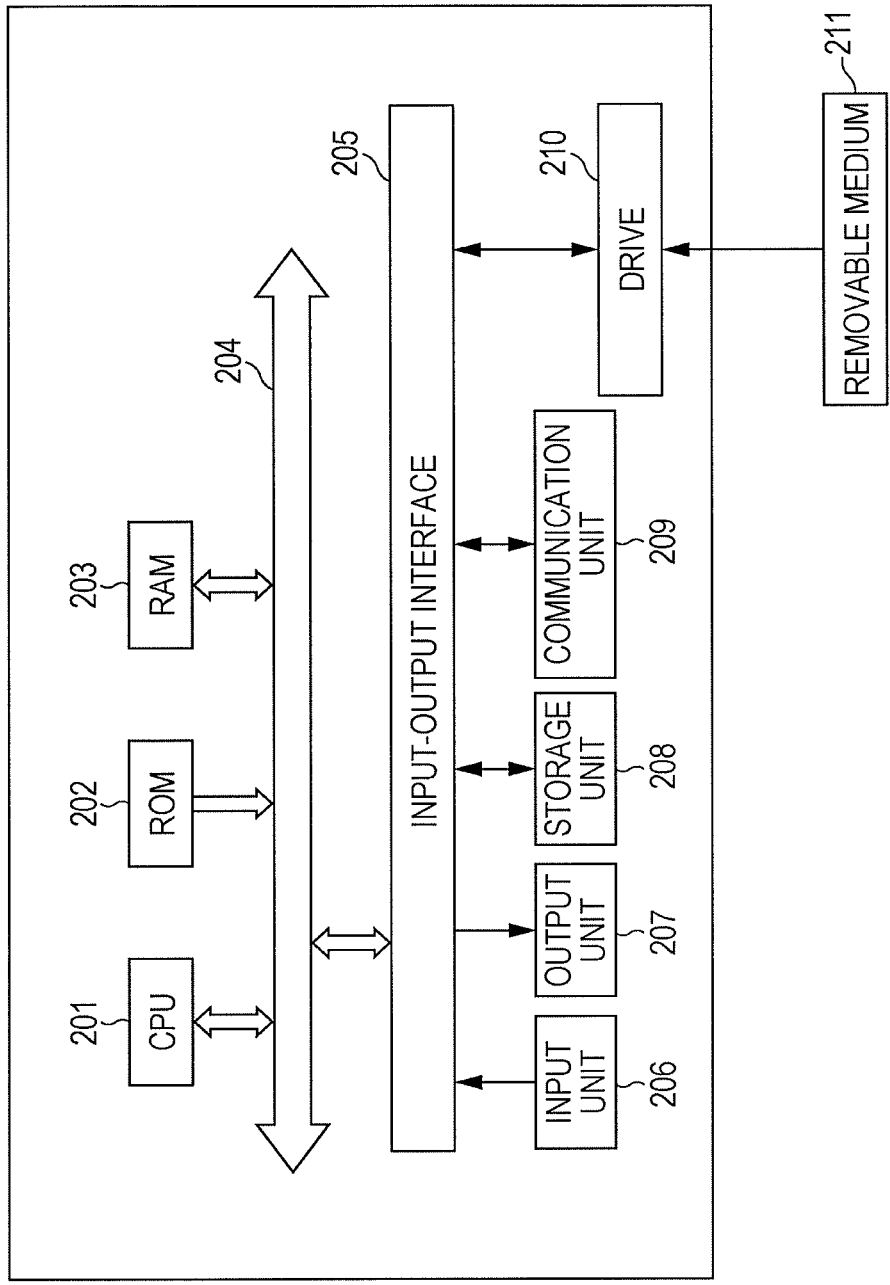
FIG. 13 is a block diagram explaining a recording medium.

FIG. 13 is a block diagram illustrating the hardware configuration of a personal computer for executing the above-described series of processing steps in accordance with a program.

In the computer, a central processing unit (CPU) 201, a read only memory (ROM) 202, a random access memory (RAM) 203 are connected to each other via a bus 204.

The bus 204 is connected to an input-output interface 205. The input-output interface 205 is connected to an input unit 206, an output unit 207, a storage unit 208, a communication unit 209, and a drive 210. The input unit 206 includes a keyboard, a mouse, and a microphone. The output unit 207 includes a display and a speaker. The storage unit 208 includes a hard disk or a nonvolatile memory. The communication unit 209 includes a network interface. The drive 210 drives a removable medium 211 such as a magnetic disk, an optical disk, a magneto-optical disk, or a semiconductor memory.

In the computer with the above-described configuration, the CPU 201 loads, for example, a program stored in the storage unit 208 into the RAM 203 via the input-output interface 205 and the bus 204 and executes the program, thus performing the above-described series of processing steps.

As for the program executed by the computer (the CPU 201), the program recorded on the removable medium 211, serving as a package medium including, for example, a magnetic disk (including a flexible disk), an optical disk such as a compact disc-read only memory (CD-ROM) or a DVD, a magneto-optical disk, or a semiconductor memory, may be provided. Alternatively, the program may be provided through a wired or wireless transmission medium, such as a local area network, the Internet, or digital satellite broadcasting.

After the removable medium 211 is loaded into the drive 210, the program may be installed to the storage unit 208 through the input-output interface 205. Alternatively, the program may be received by the communication unit 209 through the wired or wireless transmission medium and be then installed to the storage unit 208. Alternatively, the program may be previously installed in the ROM 202 or the storage unit 208.

The program executed by the computer may be a program including processing steps which are carried out in time series in the described order in this specification or a program including processing steps which are carried out in parallel or individually at necessary timing, for example, in response to a call request.

The term "system" in this specification represents an overall apparatus including a plurality of units.

The present application contains subject matter related to that disclosed in Japanese Priority Patent Application JP 2008-230321 filed in the Japan Patent Office on Sep. 8, 2008, the entire content of which is hereby incorporated by reference.

It should be understood that embodiments of the present invention are not limited to the above-described embodiments and various modifications can be made without departing from the spirit and scope of the present invention.

What is claimed is:

1. An information processing apparatus comprising:
   a degree of activity database configured to manage a degree of activity calculated based on one or more operations performed by a user on a predetermined item, the degree of activity reflecting the user's interest or taste at the time of performing the one or more operations;
   a first extracting unit configured to extract a first recommendation list, the first recommendation list including items from a recommendation list based on the degree of activity;
   a taste managing unit configured to manage taste of the user;
   a second extracting unit configured to calculate a degree of similarity between the managed taste and each of the items from the recommendation list to extract a second recommendation list, the second recommendation list including items from the recommendation list with a high degree of similarity; and
   one or more item recommending units configured to recommend one or more items among the items in the first recommendation list and the second recommendation list to the user.

2. The information processing apparatus according to claim 1, wherein the degree of activity is calculated by adding values pre-set for each respective operation of recording, viewing, and transferring the corresponding item to another apparatus.

3. The information processing apparatus according to claim 1, wherein the degree of activity is attenuated at predetermined intervals.

4. The information processing apparatus according to claim 1, further comprising:
   a multiplying unit for calculating a value indicating to what extent viewing in series is recommended and multiplying the degree of similarity, extracted by the second extracting unit, by the calculated value.

5. A computer-implemented method for information processing, comprising the steps of:
   managing, using at least one processing unit, a degree of activity calculated based on one or more operations performed by a user on a predetermined item, the degree of activity reflecting the user's interest or taste at the time of performing the one or more operations;
   extracting a first recommendation list, the first recommendation list including items from a recommendation list based on the degree of activity;
   managing taste of the user, the taste being stored in storing means;
   calculating a degree of similarity between the managed taste and each of the items from the recommendation list to extract a second recommendation list, the second recommendation list including items from the recommendation list with a high degree of similarity; and
   recommending one or more items among the items in the first recommendation list and the second recommendation list to the user.

6. The method according to claim 5, wherein the degree of activity is calculated by adding values pre-set for each respective operation of recording, viewing, and transferring the corresponding item to another apparatus.

7. The method according to claim 5, wherein the degree of activity is attenuated at predetermined intervals.

8. The method according to claim 5, further comprising:
   calculating a value indicating to what extent viewing in series is recommended and multiplying each of the degree of similarity by the calculated value.

9. A non-transitory computer-readable recording medium having stored therein a program that, when executed by a computer, causes the computer to execute a process comprising the steps of:
   managing a degree of activity calculated based on one or more operations performed by a user on a predetermined item, the degree of activity reflecting the user's interest or taste at the time of performing the one or more operations;
   extracting a first recommendation list, the first recommendation list including items from a recommendation list based on the degree of activity;
   managing taste of the user, the taste being stored in storing means;
   calculating a degree of similarity between the managed taste and each of the items included in the recommendation list to extract a second recommendation list, the second recommendation list including items from the recommendation list with a high degree of similarity; and
   recommending one or more items among the items in the first recommendation list and the second recommendation list to the user.

* * * * *